W. E. WOODARD.
SELF LOCKING PIN.
APPLICATION FILED FEB. 25, 1914.
1,111,513.
Patented Sept. 22, 1914.
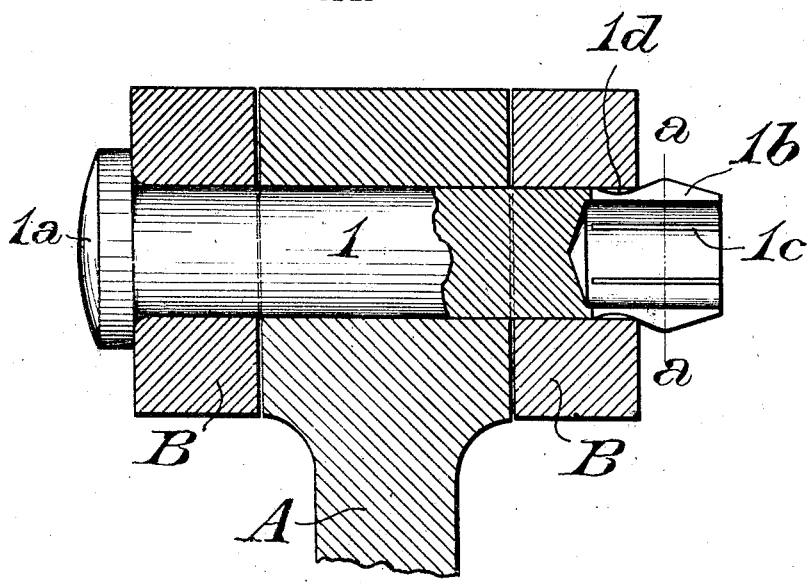
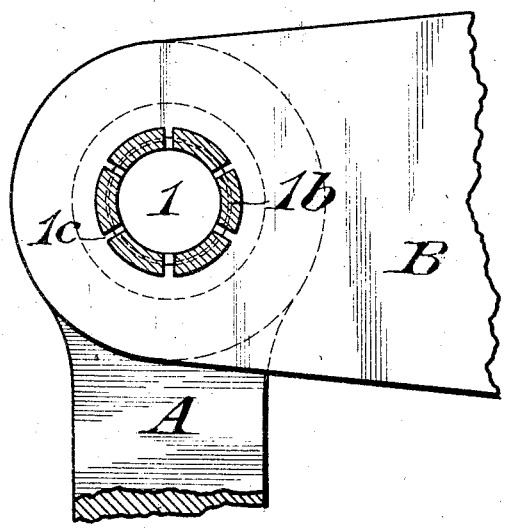

UNITED STATES PATENT OFFICE.

WILLIAM E. WOODARD, OF SCHENECTADY, NEW YORK.

SELF-LOCKING PIN.

1,111,513.  Specification of Letters Patent.  Patented Sept. 22, 1914.

Application filed February 25, 1914. Serial No. 820,695.

*To all whom it may concern:*

Be it known that I, WILLIAM E. WOODARD, of Schenectady, in the county of Schenectady and State of New York, have invented a certain new and useful Improvement in Self-Locking Pins, of which improvement the following is a specification.

My invention relates to means for connecting or holding together, two adjoining members of a machine or other structure, particularly in cases where the capacity of relative movement of said members is to be provided, and where said members are subjected to jars or vibrations in service.

The object of my invention is to provide a connecting medium which shall be readily manually attachable to and detachable from the members to be connected, and which shall be exempt from liability to accidental or undesired detachment therefrom, without necessitating the use of an independent device for that purpose.

The improvement claimed is hereinafter fully set forth.

In the accompanying drawings: Figure 1 is a view, partly in elevation and partly in longitudinal central section, of a self-locking pin embodying my invention, as applied in connecting two members of a structure; and, Fig. 2, a transverse section through the same, on the line $a\ a$ of Fig. 1.

In the practice of my invention, I provide a pin, which is of cylindrical form, throughout the major portion of its length, and which is usually, though not necessarily, provided, at one end, with a head, $1^a$. A plurality of flexible locking prongs, $1^b$, is formed on the opposite end of the bolt, which may be done by boring it out at and adjoining said end, turning the periphery of the metal surrounding the bore into the form shown in section in Fig. 1, and cutting a plurality of longitudinal slots, $1^c$, in the metal surrounding the bore, extending to or near the bottom of the bore. The pin is forged of sufficiently great diameter adjoining the end on which the locking prongs, $1^b$, are to be formed, to permit the prongs to project circumferentially beyond the body of the pin, that is to say, that its finished diameter at the transverse plane of greatest thickness of the locking prongs shall be greater than the diameter of its body or bearing surface portion which passes through the members to be connected. The locking prongs are, as clearly shown in Fig. 1, of triangular longitudinal section, and are inwardly inclined, in opposite directions, toward the bore, terminating, at their inner ends, *i. e.*, those toward the head of the pin, on a diameter which is less than that of the bearing surface portion of the pin which passes through the members to be connected. In other words, the inner ends of the locking prongs may be described as extending to, and terminating at, a circumferential groove, $1^d$, in the pin.

As shown in the drawings, the locking pin above described is applied for the connection of an arm or link, A, to a bar or lever, B, having jaws on its end between which the arm, A, is fitted. The pin, 1, passes through, and fits freely in, the members, A and B, and is of such length that the inner inclined faces of the locking prongs, $1^b$, will be in contact with the edge of the bore of the adjoining jaw of the member, B, but without perceptible pressure thereon, when the pin is set in operative position. The locking prongs being, as shown, disposed in a circumferential series, form an end stop for the pin which encircles its axis and therefore bears uniformly and with substantial continuity on the adjoining connected member. The pin is readily insertible into the opposite jaw, as the outer inclined faces of the locking prongs are pressed inwardly when entered into said jaw, and when the pin has been moved in until its head comes into contact with said jaw, the locking prongs are released from the pressure of the opposite jaw upon them and spring outwardly beyond the bore of the jaw, thereby holding the pin in position against accidental or undesired displacement. The pin may be easily removed whenever required, by inserting a pin or drift in the bore and pushing it out by pressure thereon, which forces the locking prongs inwardly and permits the withdrawal of the pin.

Instead of boring out the end of the pin for the formation of the locking prongs, the pin may be forged hollow at and adjoining the end at which they are to be located, or the pin may be made of a section of sufficiently heavy tubing, the head and prongs being upset. It will also be obvious that, if desired, both ends of the pin may be made in the expansible and collapsible form herein set forth.

The provision of the collapsible and automatically expansible fastening end formed by the plurality of locking prongs and circumferential groove enables the separate cotter or split pin ordinarily employed to be dispensed with, and the circumferential groove which adjoins the locking prongs, further serves to prevent the formation of a shoulder at the ends of the prongs, and also prevents the concentration of the stress, resultant upon the bending of the prongs, at their ends, correspondingly reducing liability to breakage.

I claim as my invention and desire to secure by Letters Patent:

1. A self locking pin having an integral collapsible and expansible end, extending from its body or bearing surface and surrounding a cylindrical bore, its major diameter at its collapsible and expansible end being greater than that of its body and thereby providing an end stop which encircles its axis, and its minor diameter at said end being less than that of its body.

2. A self locking pin having a plurality of integral collapsible and self expansible locking prongs extending from one end of its body or bearing surface and surrounding a cylindrical bore, said locking prongs normally projecting beyond the diameter of the body of the pin and providing an end stop which encircles its axis, and inwardly terminating on a diameter less than that of the body.

3. A self locking pin having a plurality of integral collapsible and self expansible locking prongs extending from one end of its body or bearing surface and surrounding a cylindrical bore, and a circumferential groove adjoining said locking prongs and reducing the rigidity of the end of the pin, said locking prongs being of t ngular section and outwardly inclined from said groove to a diameter greater than that of the body.

4. A self locking pin having a cylindrical bore adjoining one end of its body or bearing surface, the pin being longitudinally slotted throughout substantially the entire depth of the bore, and being finished on the exterior thereof so as to form a plurality of collapsible and self expansible locking prongs, which are of triangular longitudinal section and project normally beyond the diameter of the body, and terminate, at their inner ends, at a circumferential groove in the body.

WILLIAM E. WOODARD.

Witnesses:
FRANK H. SAUTER,
HERVEY G. PHELPS.